…

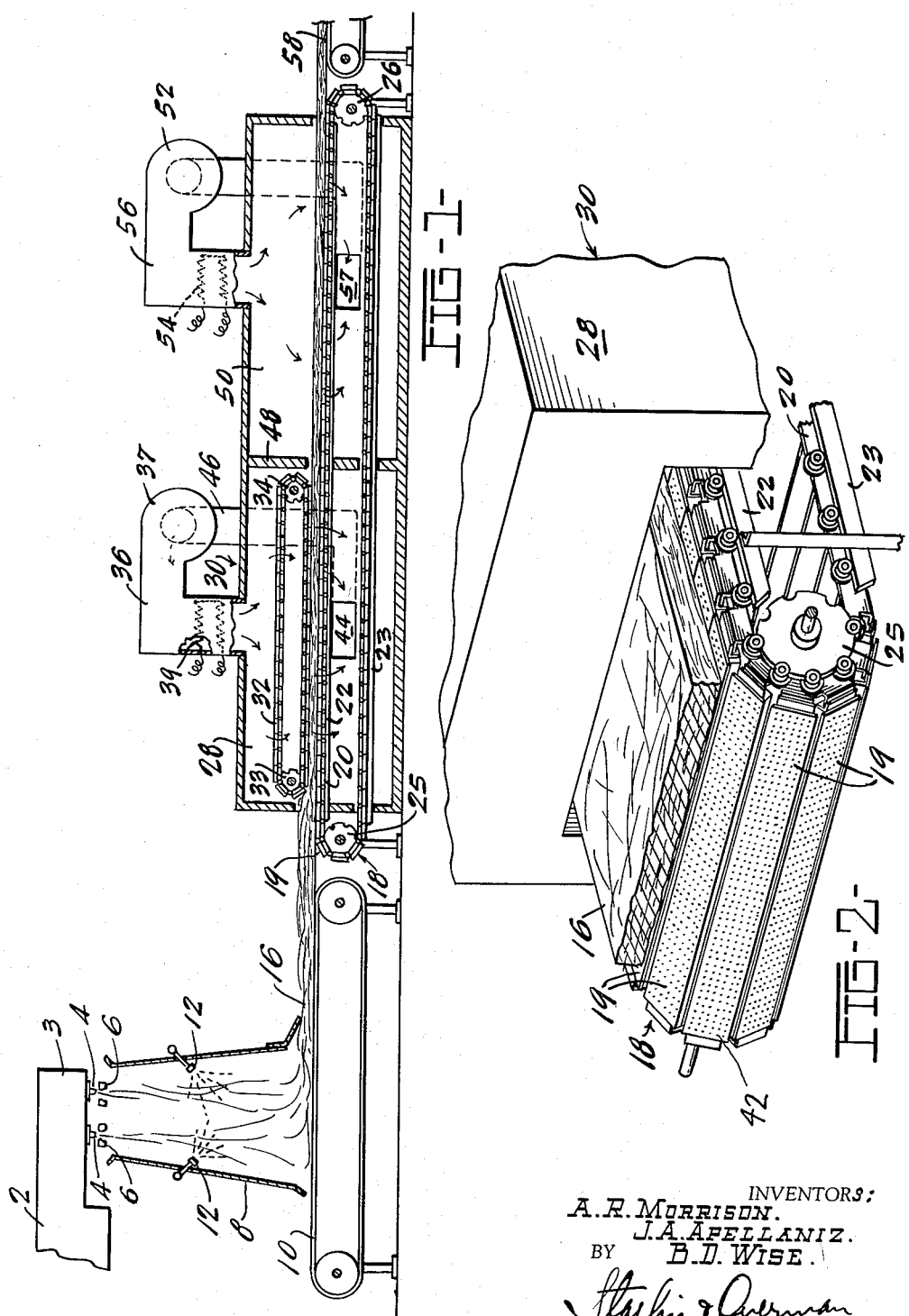

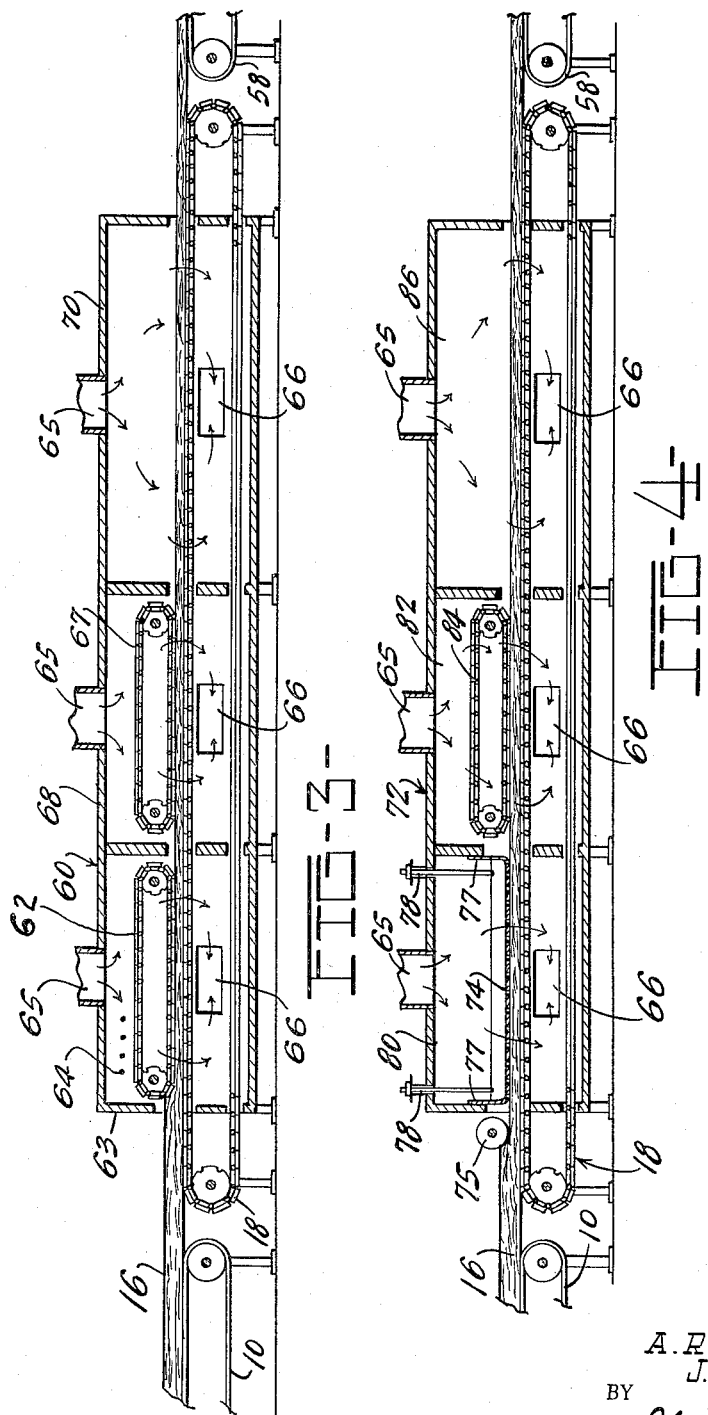

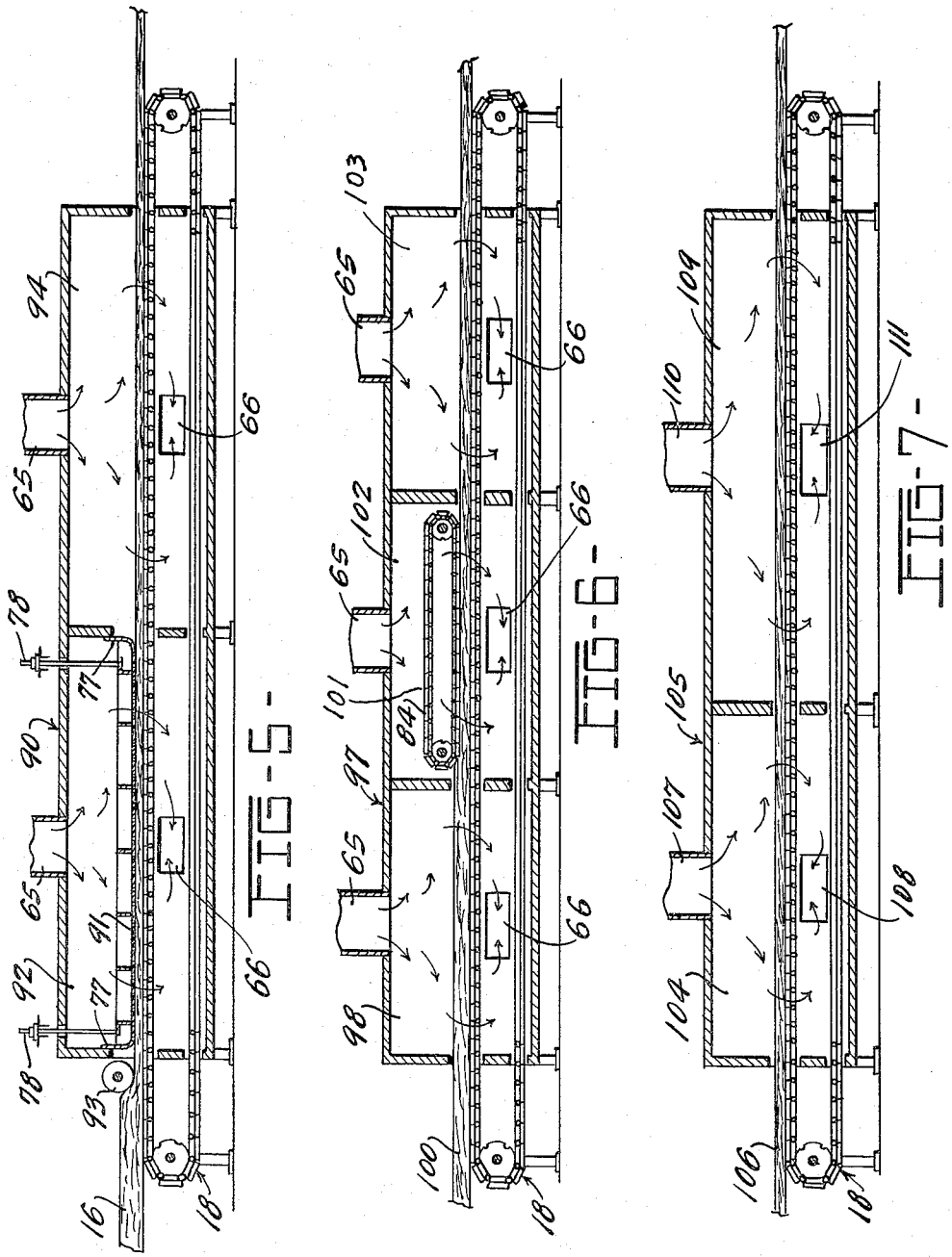

United States Patent Office 2,997,096
Patented Aug. 22, 1961

2,997,096
MULTIPLE STAGE METHODS AND APPARATUS FOR CURING THE BINDER OF FIBROUS GLASS MASSES

Albert R. Morrison, Jose A. Apellaniz, and Belford D. Wise, Newark, Ohio, assignors to Owens-Corning Fiberglas Corporation, a corporation of Delaware
Filed May 16, 1957, Ser. No. 659,716
20 Claims. (Cl. 154—27)

This invention relates to improved methods and equipment for curing the binder, usually of a thermosetting resin nature, by which masses of glass fibers are held to desired densities and thickness.

More specifically this invention relates to means and methods of curing the binder in separate steps or stages, whereby the curing is accomplished more expeditiously, and more uniform dimensions and improved appearance are imparted to the fibrous glass masses.

Glass fibers utilized in the products to which this invention relates are more commonly and preferably of a diameter between fifteen and twenty, hundred thousandths of an inch but may have diameters ranging between three and one hundred, hundred thousandths. Such fine fibers are produced by well established processes in which high pressure steam or air jets, and blasts of superheated gases are used singly or in series to attenuate streams of molten glass discharged from minute orifices. These fibers, in various lengths, usually not exceeding several inches, drop away from the forming station upon a collecting conveyor. The fibers accumulate thereon to a depth ranging up to eight inches or more, according to the thickness desired, and as controlled by the speed of the conveyor and the production rate of the fibers.

A solution or suspension of a resinous binder is introduced, usually by spray devices, into the fibrous glass mass in association with or shortly following the fiber forming and collecting operation. The resin constituent generally amounts to five to twenty percent by weight of the total mass. The web or pack of resin impregnated fibrous glass is then transferred to and rapidly advanced upon a suitable conveyor, ordinarily an apron carrier design, through a long oven in which the mass is thoroughly heated to completely cure the resin.

To establish the required density of the final product the pack of glass fibers is usually held in compressed form through the oven by an upper conveyor flight with its lower advancing course running parallel with the main lower conveyor at a selected distance above it. Some attempt has also been made to use a stationary compression or skid plate fixed above the lower conveyor to hold the pack in compacted form. Such upper conveyor flights and skid plates would ordinarily be of a foraminous nature to allow heated air to reach and circulate through the glass fiber pack. Naturally, the higher the velocity of the air, the faster heat is transferred to the resin constituent and the more quickly the curing is completed.

A tremendous output is possible with these systems when utilizing a fast curing resin such as phenol formaldehyde and high speed conveyor movement. However, because of the rapid conveyor travel, it is necessary to have baking or curing ovens in lengths of one hundred and more feet. These are very expensive to build, and costly and troublesome to maintain, particularly when the conveying mechanism includes an upper as well as a lower conveyor flight.

Objectionable features of this conventional arrangement, in addition to the heavy investment required, include the extensive floor space occupied, replica marking of the fibrous glass pack by openings or irregularities in the faces of the conveyors, particularly when the pack is under compression, and deforming or marking of the glass fiber mass by the force of the air movement.

A principal object of this invention is to provide a method and apparatus for curing the resin binder of a compacted mass of fibrous glass with a compressing, upper conveyor flight or skid plate of considerably lesser length than previously considered necessary.

A further object is the provision of a curing technique which effects completion of the cure in a considerably shorter oven installation.

Another important object of this invention is the provision of a method and an arrangement of equipment which reduces or eliminates the defacement and deformation of fibrous glass masses caused by the surface contour of compression conveyors and by the velocity of the curing air stream.

A further object is to effect more expeditious production of improved products of fibrous glass.

These and other objects and advantages of the invention are primarily attained through an ingenious division of the curing procedure into multiple stages.

Applicants have discovered that well before full curing or polymerization of the resin binder is secured, setting of the binder reaches a point establishing substantially permanent form to the fibrous glass mass; and that this presetting action may be incorporated in a separate initial stage of the curing operation to prepare the full mass of fibers or the surface layer thereof to resist subsequent defacing and deforming effects. This preliminary setting, by permitting the subsequent use of a greater velocity of curing air, makes possible a speedier completion of the curing.

It further enables the compressing conveyor flight or skid plate to be shortened, as the glass fiber pack when fully preset remains in its compacted form without the continued pressure of such a compression member. Beyond the termination of the overhead flight the curing air then has better access to the glass fiber mass and can more readily penetrate it to carry polymerizing heat to the confined resin constituent. A more uniform and faster curing operation results.

Several preferred arrangements and methods by which this invention may be practiced are hereinafter described, and illustrated in the drawings, in which:

FIGURE 1 is a schematic, longitudinal, vertical section of a glass fiber pack production line including a two zone oven arrangement embodying one form of this invention;

FIGURE 2 is a broken, perspective view of the entrance of the oven of FIGURE 1;

FIGURE 3 is a diagrammatic, longitudinal, vertical section of a three zone curing oven through which the fibrous glass pack is carried upon an apron conveyor, with an upper compression conveyor in the first and second zones;

FIGURE 4 is a like presentation of another embodiment of the invention in which there is a skid plate compressing the pack against the conventional apron conveyor in the initial zone, an upper compression conveyor flight above the main conveyor in the second zone, and free air circulation space above the main conveyor in the final zone;

FIGURE 5 is a diagrammatic section of a two zone oven installation with an upper skid plate in the first zone and free air circulation space above the main conveyor in the last zone;

FIGURE 6 is a similar sectional showing of a three zone oven arrangement in which heated air is circulated down against or through the conveyed pack in the first zone, an upper conveyor compresses the pack in the following zone, and free circulating air space above the pack is utilized in the final zone; and FIGURE 7 shows in longitudinal section a two zone curing oven for uncompressed stock, in both zones of which circulating air is directed down against the uncompressed pack.

Referring to the drawings in more detail, the glass wool pack production line illustrated in FIGURE 1 begins with the glass melting tank 2, from the forehearth 3 of which, the molten glass flows in fine streams out orifices in bushings 4. The threads of glass are drawn downwardly and attenuated into fibers by the blast of air or steam jets discharged from manifolds 6.

As the fibers fall within hood 8 toward the receiving conveyor 10 discrete particles of an uncured binding agent, preferably phenol formaldehyde, are introduced into the mass of fibers by the spray nozzles 12 projecting into the hood 8. The glass fibers impregnated with the binder accumulate in a layer or pack upon the receiving conveyor 10 passing across the bottom of the hood 8.

The fibrous glass web 16 thus formed commonly has a width of four feet and in this instance will be considered as having an original thickness of four inches. The continuous web is advanced upon receiving conveyor 10 for delivery to the foraminous conveyor 18. The latter may be a woven wire belt type, but is preferably an apron conveyor with perforated metal slats 19 mounted between a pair of endless roller chains 20, as depicted in FIGURE 2. The courses of each chain are supported upon runways 22 and 23 between end sprockets 25 and 26.

The fibrous glass web 16 borne by conveyor 18 enters the first compartment 28 of the curing oven 30. Here the web is brought down to its desired ultimate thickness, which may, for example, be two inches, by the upper compression conveyor 32. This runs between sprockets 33 and 34 and is of the same construction as conveyor 18, with transverse perforated slats or panels 19.

While the web 16 is traveling beneath compression conveyor 32, air at a curing temperature is forced down through the mass of the glass fibers. This air is directed into compartment 28 through duct 36 by the blower 37. Suitable electrical heating elements 39 in the duct raise the air to the desired temperature, which may be approximately 450° Fahrenheit should the binding agent be a phenol formaldehyde resin. The latter has been found very effective because of its quick curing quality as well as its final strength and stability. Other plastic resins such as urea formaldehydes, melamines, and alkyds are suitable as binding agents and also have intermediate curing stages which make them adaptable to this invention. The air flows without serious resistance through the conveyor courses as the slats 19 have closely positioned perforations 42, which may for example be one-eighth inch in diameter with their centers spaced three-sixteenths of an inch apart.

The air after passing down through the web 16 and the upper advancing course of conveyor 18 is exhausted through outlet 44. The air replaced at least in part by fresh air, may be directed back through a return duct 46 to the blower 37 for recirculation through the first stage compartment 28.

The length of the compartment 28 is such that sufficient heat is carried to the binding agent, as the web progresses through the compartment, to bring the binding agent to a point of curing where it has set sufficiently to retain the glass fiber mass in its compressed condition without the continued aid of the compression conveyor flight 32. This degree of binder curing is reached generally about midway of the normal full curing period but may be attained considerably earlier or even later depending upon various factors such as the glass fiber diameter, and the density and thickness of the web.

Should the web have a density of approximately two pounds per cubic foot and the cited thickness of two inches the presetting may be established in thirty seconds. With the conveyor traveling one foot per second compartment 28 need be only thirty feet long for this particular glass wool stock. However, as packs of various specifications are frequently scheduled on the same production line it is not ordinarily practical to have the oven length adapted to one specific product. This early setting, a discovery forming the main basis of this invention, enables the upper compression conveyor 32 to be shortened proportionately and to be restricted to the first compartment. As these compression flights conventionally extend the full length of the curing oven, a distance from one hundred to one hundred and fifty feet for packs of average sized fibers, the considerable savings in initial installation cost and later maintenance, arising from this major reduction in their lengths, may be easily appreciated.

Upon leaving first compartment 28 the web 16 passes below partition 48 and enters the second or final compartment 50 of the two stage oven 30. Compartment 50 may, of course, be a separate oven structure instead of the illustrated partitioned section. To finish the curing of the compressed pack of the density and thickness referred to, this second section need be no longer at the most than the first section. In fact, a length of twenty-five feet should suffice.

There is only free air space above the traveling web 16 in the final curing section 50. The web remains in its compressed form there through due to the preliminary setting of the binder and the strength with which the binder holds the mass of glass fibers together.

With the dimensional stability of the web established, the completion of the curing can be accomplished in this compartment more rapidly than is usually possible. Because of the absence of the upper conveyor flight the heated air reaches and permeates the fibrous pack more readily and uniformly. Further, because of the comparative rigidity and resistance to deforming acquired by the mass of glass fibers, the air velocity may be increased to carry polymerizing heat more quickly to the binder constituent. For this reason the blower 52 delivering air to compartment 50, is provided with a greater output capacity, and the heating elements 54 in duct 56 are designed to furnish a higher heat production. For the finish curing in this separate section, a different, more suitable temperature of approximately 500° Fahrenheit may be used. This would be considered too high for best results in the initial portion of the curing operation.

As shown in the drawings, the pack is discharged from oven 30 to a following conveyor assembly 58 on which the pack may be cut and trimmed according to the requirements of the product for which it is intended.

From the above it may be realized that the overall length of the two compartments of this two stage oven may be much shorter than the ordinary single stage curing oven for compressed fibrous glass products, and in addition a far shorter upper compression conveyor flight may be utilized.

In FIGURE 3 is illustrated a three stage curing oven 60 also adapted to produce compressed glass wool stock such as that created by the oven arrangement of FIGURE 1. In this view the formed fibrous glass web 16 is shown arriving upon conveyor 10 from the forming station. The foraminous conveyor 18 carries the web under the compression flight 62 in the first compartment 63. This flight is heated to a temperature preferably about 450° F. by the flow of hot air through its perforations, or it may be of imperforate form and, if so, it is heated by adjacently positioned electrical elements indicated at 64.

The arrangement of compartment 63 with inlet 65 and outlet 66 for the heated air, is generally similar to that of the first compartment 28 of the oven of FIGURE 1, except that it is considerably shorter. The purpose here is not to bring the full thickness of the pack to the preset stage but to give only the surface layer a stiffening preliminary cure. This takes less time than presetting the full thickness of the pack, requiring roughly between five and twenty seconds, depending upon the thickness and density of the pack as well as the fiber diameter.

Following this surface conditioning, a higher velocity air flow at a like temperature may be directed down through upper flight 67 in the second compartment 68 and into the compressed pack without disfiguring or disrupting the fibrous mass. In this manner the completion of the presetting curing cycle is greatly accelerated, reducing the time required by as much as fifty percent.

Upon leaving the second compartment 68 the fibrous pack possesses complete dimensional stability and retains its established compactness through the final curing compartment 70 where the heated air at an optimum temperature, which may be 500° F., has direct access to the pack. The pack is then delivered to the sequential conveyor 58 for finishing operations. The length of the first two compartments together will ordinarily be less than the length of the final compartment. However, there will be considerable variance in this relationship depending upon the character of the pack.

It may be realized that considerable time and oven length over conventional arrangements may be saved by using a combination of the first two sections only of the three zone oven 60 of FIGURE 3. With this modified form it is necessary to elongate the second section 68 to effect therein a complete polymerization of the phenol formaldehyde binder. High velocity air may be used in the second compartment following the top layer stiffening accomplished in the first compartment. While the reduced time required would be as favorable as that of the three stage oven, the longer upper flight would add considerably to the installation investment.

The three stage oven 72 of FIGURE 4 has all the elements of the oven of FIGURE 3 except for the substitution of the stationary skid plate 74 for the compression flight 62 in the first compartment 64, and the addition of the precompression roller 75 immediately in advance of the skid plate. The latter is preferably perforated for the passage of heated air in the manner of the slats or panels 19 of the apron conveyor 18 and of the various compression flights. Through upward extensions 77 the skid plate has a snug but slidable contact with the walls of compartment 64. It may be raised or lowered by adjustment of hanger rods 78 to hold the thickness desired in the glass wool pack.

While skid plates such as 74 have previously been proposed as a substitute for upper conveyor flights for compressing glass wool stock, there are serious drawbacks in their use in the long lengths which would be required in the regular elongated curing ovens. It would be most difficult to reach all areas of such stationary plates for cleaning and other service purposes, while the usual compression conveyor flights may be turned to bring any portion to an inspection and servicing area. Also, in the great lengths of the skid plates which would be required in a conventiional oven installation, the accumulated drag effect upon the surface of the pack would be disrupting at least to some forms of the fibrous glass masses.

In the arrangement presented in FIGURE 4 the skid plate 74 is of a moderate size which may more easily be installed, adjusted and serviced, the latter by complete removal if desired.

As illustrated, the precompression roller 75 compacts the fibrous glass web immediately in front of the skid plate 74. This eliminates any damming or dragging effect the fore end of the skid plate may have upon the web as it passes beneath the plate.

In the first compartment 80 the surface layer of the pack 16 is given a preliminary set. Only a mild movement of air through the plate 74 is necessary or the plate may serve as the heat transfer medium without being perforated. The maintenance of highly heated air above the plate then holds the plate at the required temperature.

The curing progression of the three stage oven 72 of FIGURE 4 is the same as that of the oven 60 of FIGURE 3, as in the second compartment 82, under upper flight 84, the full thickness of the fibrous web is brought to the preset condition and the curing operation completed in the final compartment 86.

In addition to the benefits gained by the arrangement of oven 60, including the permissibility of high velocity air in the second stage and flightless final curing in the last stage, a further beneficial result is secured by the use of the skid plate 74 in oven 72.

Whether or not the compression flight 62 of FIGURE 3 is perforated, there will be spacings between its metal slats 19 or other irregularities in its web contacting surfaces. These surface configurations, as well as the outlines of perforations if the latter are present, will imprint themselves upon the surface of the compressed web to a degree rather proportional to the extent the web is compressed. This marking, while particularly noticeable and objectionable in only the more highly compacted products is eliminated on the upper side of the pack by the use of the skid plate. This results from the ironing effect of the plate with the web sliding beneath the full length thereof past any perforations, if they are present. Because of the nature of the plate it can be constructed with a much smoother continuous surface than it is possible to create in a flexible conveyor flight.

As may be noted, this method has provided one side only of the fiber glass product with a smooth, unmarked surface. However, in practically all cases, this is sufficient as the compressed fibrous glass panels involved are ordinarily installed with one side concealed. It has been necessary, in connection with conventionally produced quality panels, to grind off the surface imperfections on the ultimately observable side of the panel.

In the two stage oven 90 of FIGURE 5 there is a skid plate 91, in the first compartment 92, of sufficient length to bring, with the assistance of the hot air directed down through the plate, the full thickness of the compressed pack to the permanent set stage of curing. The skid plate compartment discharges the web with an unblemished surface to the final compartment 94 where the polymerization is rapidly completed, without deformation occurring, by the use of high velocity air movement.

In all of the embodiments of this invention so far described the fibrous glass stock has been given a preliminary setting cure while in a forcibly compacted state. It is, however, possible to give the surface layer of an uncompressed pack an initial stiffening cure with a timed hot air treatment. In order to guard against partial setting of the main body of the glass fiber stock, the air movement is minimized to reduce air penetration of the stock.

In FIGURE 6 is shown a three stage oven 97 adapted to practice this method of surface treatment. In the first compartment 98 heated air from inlet 65 has free access to the upper layer of the uncompressed fibrous web 100 and stiffens this layer only by a suitable partial cure. The web is then compacted by the compression conveyor flight 101 in the second compartment 102.

With the surface stiffening effected in compartment 98 the fibrous pack has a thin top shield to oppose imprinting by compressing flight 101 in compartment 102 and to stand up against forceful streams of curing air directed into the pack through the perforations of the flight. In the last compartment 103 curing air has direct access to the open surface of the pack and rapidly completes the curing operation. The above method is inclined to weaken the resilient propertiy of the final product so precise control is necessary in its execution.

In FIGURE 7 is illustrated a two-stage oven, embodying this invention, arranged to secure the benefits thereof in connection with the curing of a fibrous web in uncompressed form. Low velocity, non-disrupting air movement between inlet 107 and outlet 108 is utilized in the first compartment 104 to bring about partial curing to stiffen at least the upper layer of the web 106. The web is thus prepared to resist deformation by high velocity, fast curing air circulated from inlet 110 to outlet 111 in the final compartment 109.

This arrangement is advantageous where it is desired to maintain uniform dimensions and an even surface contour in uncompressed products. Where these characteristics are not important high velocity air may be directed against the pack in a conventional oven having a single section.

A protective skin or stiffened surface layer may also be applied to an uncompressed pack of glass wool by passing the pack in light contact beneath a heated skid plate or upper conveyor flight. This would be similar to the manner of creating the protective layer upon packs under compression by such members.

While air has been referred to herein as the heat transfer medium, steam is quite equally effective, although of a more dangerous nature. Where the term "air" appears in this description and in the following claims it should, accordingly, be interpreted sufficiently broadly to encompass steam.

Certain specific temperatures have been cited in the explanation of the operation of the various embodiments. These should be considered as those presently preferred, but it should be realized that the variable specifications of the glass wool stock and the different proportions of the binder component may require different temperatures. For instance with some packs final heat of 500° F. will cause charring or punking of the binding agent.

However, for general purposes, a temperature between 400° and 450° F. is recommended for effecting the presetting or B-stage curing of the crust or full thickness of a pack; and a temperature between 450° and 500° F. is considered best for bringing the resin binder to full polymerization of the final C-stage of reaction.

The stages of curing are distinguished by different degrees of temperature, progressively increasing air velocities, or by the presence or absence of compression members. All of the embodiments illustrated have a flightless final section, although, as previously explained, certain aspects of the invention are more likely to be utilized in a two stage arrangement with the glass fiber pack forcibly compacted throughout the cure finishing zone.

The skin or top layer setting may be accomplished, as has been explained, by hot air treatment alone, by heated imperforate compression members, or by air pervious compression members. The collateral, or successive preliminary setting of the full thickness of the fibrous pack is secured by hot air alone or hot air passing through foraminous compression flights or skid plates. The final cure is preferably left to hot air alone in a flightless, tunnel type or soaking oven, but may be completed under a compression member.

It should be apparent from the preceding that adequate apparatus and methods have been provided to attain the advantages and the objects of the invention including lower manufacturing costs, higher output, products of improved appearance and structure, and equipment requiring less floor space and capital investment.

In view of the somewhat general references to glass wool stock in the foregoing discussion of the selected embodiments of the invention, it may be well to emphasize that the need of protection against the disrupting force of high velocity air is most definite in regard to packs of light density, and defacement by conveyor surface irregularities is a more serious problem when the pack is highly condensed.

Reference to air velocities herein has been purposely comparative, instead of specific, because of the wide range of velocities permissible with different glass wood stocks. For instance, a pack four inches thick, of a pound and a quarter per cubic foot density, may be able to withstand, without deformation, an initial velocity of only twenty five feet per minute, while a pack of the same thickness, but twice the density, will resist deformation under air at double that velocity. After preliminary setting, of either a skin layer or the full thickness, the allowable increase in velocity may be as much as three hundred percent, for example, from thirty to one hundred and twenty feet per minute.

In recapitulation, the principal features of this invention include multiple stage curing methods and apparatus wherein the resin impregnated fibrous glass is first given a preliminary set either in its surface layer only or throughout its full thickness. In most of the forms selected for disclosure the preliminary setting is divided into the steps with the skin forming first. While technically superior, such three zone arrangements are too elaborate for some processing and not sufficiently elastic for many production lines alternately handling a number of different products.

We claim:
1. The method of curing the thermosetting binder of a fibrous glass mass, which comprises applying in a first zone only enough heat to the mass to bring the thermosetting binder in a source layer only of the mass to an intermediate curing stage at which the binder has set sufficiently to stiffen the surface layer of the mass, then in a second zone, with the mass formed to the final thickness desired, applying heat at an increased rate, by driving heated air through the mass, to bring the binder throughout the full thickness of the mass to the intermediate curing stage, and in a final zone applying additional heat to complete the curing of the binder throughout the full thickness of the mass.

2. A method according to claim 1 in which the mass is held forcibly compressed by exterior means in the second zone and released from such exteriorly forced compression in the final zone.

3. A method according to claim 1 in which the exterior side of the surface layer of the mass is held in a smoothed condition while the thermosetting binder in the layer is brought to an intermediate curing stage in the first zone.

4. An apparatus for curing the thermosetting binding agent of a fibrous glass mass including a carrier for the mass, a first curing station in the path of the carrier, a metallic heat conductor in the form of a smooth-surfaced, imperforate, stationary plate in said first station positioned to contact the upper surface of the mass supported upon the carrier and transfer heat thereto for curing the binding agent adjacent said upper surface, means supplying heat to said conductor, a second curing station in the path of the carrier following the first curing station, a foraminous conveyor flight in the second curing station positioned to compress the mass against the carrier, and means driving heated air down through the said flight and the mass for curing the binding agent throughout the mass.

5. An apparatus according to claim 4 in which there is a third curing station in the path of the carrier and there are means therein directing heated air against the full, free upper surface of the mass and through the mass to completely cure the binding agent throughout the mass.

6. An apparatus for curing the thermosetting binder of a fibrous glass mass including a carrier for the mass, a first curing station in a path of the carrier, a perforated stationary plate in the first curing station positioned to compress the mass against the carrier, means forcing heated air through the perforated plate for partial curing of the thermosetting binder, a second curing station in the path of the carrier and means in the second curing station directing heated air against the open, upper surface of the mass and down through the mass to completely cure the binding agent.

7. In an apparatus for curing the thermosetting binder of a fibrous glass mass according to claim 6 in which there is a heated air supply chamber the lower wall of which is the perforated plate and there is a telescoping association between the plate and the chamber whereby the plate may be positioned at selected levels.

8. The method of curing a fibrous mass of mineral material having a heat settable binder distributed therethrough comprising directly contacting a surface of the mass with a heated member and thus conductively applying heat to the surface of the mass in an amount sufficient to substantially set the binder in the surface to stiffen the surface without materially setting the binder in the remaining thickness of the mass, and thereafter passing heated air through the mass to set the binder throughout the thickness of the mass.

9. The method of curing the thermosetting binder of a fibrous glass mass which comprises first applying heat to the binder by directing heated air through the mass at a velocity in an initial range between twenty to fifty feet per minute and continuing such application of heat until the binder has reached an intermediate curing stage providing dimensional stability to the mass, and then applying heat to the binder to complete the curing thereof by directing heated air through the mass at a velocity in a second range in which the velocities are several times greater than the velocities in the initial range.

10. A method according to claim 9 in which the mass is held under compression during the directing of heated air therethrough at a velocity in the initial range and is released from such compression during the directing of heated air therethrough at a velocity in the second range.

11. A method according to claim 10 in which the mass is in the form of a continuous web, the heated air is directed down through the web and the upper surface of the web is entirely exposed and free of compression means when the heated air at a velocity in the second range is directed down through the web.

12. The method of curing the phenol formaldehyde binder dispersed through a resilient fibrous glass mass which comprises contacting the mass with means shaping and holding the mass in the final form desired therefor, applying heat to the mass while the mass is so held until the phenol formaldehyde binder has been brought to a semi-cured stage at which it has sufficient strength to overcome the resilience of a mass and impart dimensional stability thereto, releasing the mass from the shaping and holding means and then applying finishing heat to the mass until the phenol formaldehyde binder is completely cured.

13. A method according to claim 12 in which the finishing heat is applied by directing a stream of heated air through the mass, and the binder curing action is facilitated by having the mass free of the shaping and holding means and completely exposed to the stream of heated air.

14. The method of curing a fibrous mass of mineral material having a heat settable binder distributed therethrough comprising applying heat and pressure to a surface region of the mass to set the binder in the surface region and form a stiff, mass-enclosing shell on said surface region, and thereafter applying heat to set the binder throughout the thickness of the mass.

15. The method of curing a mass of fibrous material having a heat settable binder distributed therethrough comprising shaping the mass in the final form desired therefor, substantially setting the binder in a surface region of the mass by submitting the surface region to passing contact with a heated element to conductively transfer heat thereto, and thereafter setting the binder throughout the thickness of the mass by enveloping the mass in heated air.

16. A method according to claim 15 in which the heated element applies pressure against the surface region during the passing contact therewith and the mass is supported against such pressure by an unheated element.

17. The method of curing a heat settable binder dispersed through a mass of glass fibers comprising shaping the mass in general conformity with the final form desired therefor, supporting the mass upon an unheated, non-yielding element, applying binder curing heat to the mass by progressively bringing the surface of the mass into compressive contact with a heated surface, maintaining such contact until the binder has been cured to an extent providing dimensional stability to the mass in the final form desired therefor, and subsequently applying heated air to the mass to complete the curing of the binder.

18. A method according to claim 17 in which the final form desired for the mass is one having two opposite surfaces equidistantly spaced, the mass being supported on one of said surfaces by the unheated, non-yielding element while the other of said surfaces is progressively brought into compressive contact with the heated surface.

19. A method according to claim 17 in which a shape reinforcing shell over the surface of the mass is produced by the ironing action of the compressive contact with the heated surface.

20. A method according to claim 19 in which the heated surface is imperforate.

References Cited in the file of this patent

UNITED STATES PATENTS

| | | |
|---|---|---|
| 2,161,653 | Ellis | June 6, 1939 |
| 2,338,839 | Coss | Jan. 11, 1944 |
| 2,388,392 | Davies | Nov. 6, 1945 |
| 2,577,214 | Slayter | Dec. 4, 1951 |
| 2,655,458 | Collins | Oct. 13, 1953 |
| 2,698,260 | Meauze et al. | Dec. 28, 1954 |

FOREIGN PATENTS

| | | |
|---|---|---|
| 673,934 | Great Britain | June 18, 1952 |
| 703,023 | Great Britain | Jan. 27, 1954 |